United States Patent [19]

Oree, Jr.

[11] Patent Number: 4,473,146

[45] Date of Patent: Sep. 25, 1984

[54] POSITIONING AND ALIGNING LOADER

[75] Inventor: Samuel J. Oree, Jr., Detroit, Mich.

[73] Assignee: Braun Engineering Company, Detroit, Mich.

[21] Appl. No.: 366,192

[22] Filed: Apr. 7, 1982

[51] Int. Cl.³ .............................................. B65G 43/08
[52] U.S. Cl. ..................................... 198/395; 198/399; 409/7; 414/222; 414/224; 193/45; 221/173
[58] Field of Search ................. 414/222, 34, 224, 225, 414/226, 754, 757, 748; 409/6, 7; 294/104; 198/486, 339, 394, 417, 341, 399, 395; 193/45, 47; 221/173

[56] References Cited

U.S. PATENT DOCUMENTS

| | | | |
|---|---|---|---|
| 699,565 | 5/1902 | Pugh | 193/45 X |
| 2,711,817 | 6/1955 | Hautau et al. | 198/339 |
| 2,961,080 | 11/1960 | Smith | 193/45 |
| 3,109,530 | 11/1963 | McPherson | 198/394 X |
| 3,288,267 | 11/1966 | Taylor et al. | 198/394 |
| 3,635,323 | 1/1972 | Helfer | 409/7 X |
| 3,656,634 | 4/1972 | Pearne et al. | 414/34 X |
| 3,982,627 | 9/1976 | Isohata | 414/757 |
| 3,993,199 | 11/1976 | Jorgensen et al. | 414/757 |
| 4,265,072 | 5/1981 | Egli | 198/417 X |

Primary Examiner—Robert J. Spar
Assistant Examiner—Donald W. Underwood
Attorney, Agent, or Firm—Barnes, Kisselle, Raisch, Choate, Whittemore & Hulbert

[57] ABSTRACT

A positioning and alignment loader for a gear cutting machine adapted to receive cold formed toothed blanks, preferably of conical gear form, having differently conformed front and rear surfaces requiring positioning of the blank with a selected side up. The blanks are advanced along a chute and the position of the blank in the chute is sensed and if the blank is reversed, it is rotated 180° before further advance. Thereafter the properly positioned blank with its proper selected side up is advanced horizontally and its teeth are located in proper angular position by engagement with a toothed orientor rack located at one side of the path of advance. The properly positioned blank with its teeth in substantially precise angular location is now engaged by a pick-up device which transfers the blank into a gear finishing machine in proper stock dividing position so that the machine may remove small, substantially equal amounts of stock from opposite sides of the teeth.

5 Claims, 12 Drawing Figures

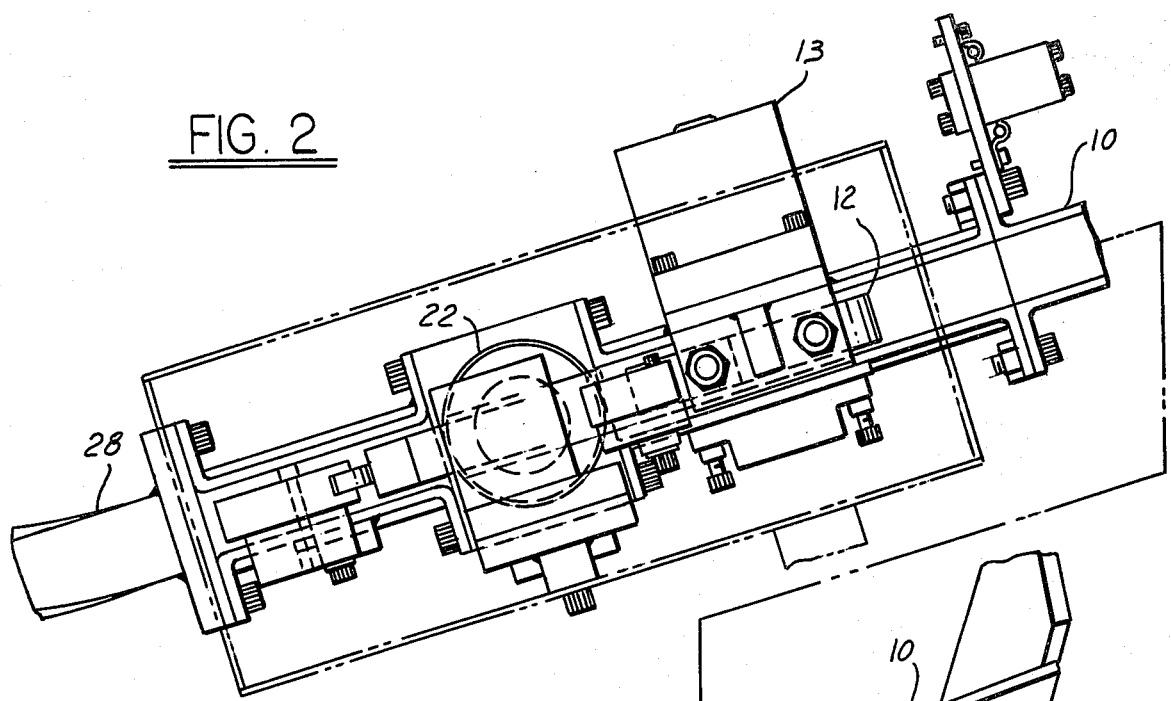
FIG. 2
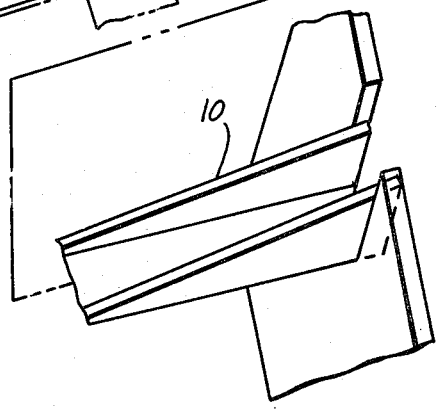
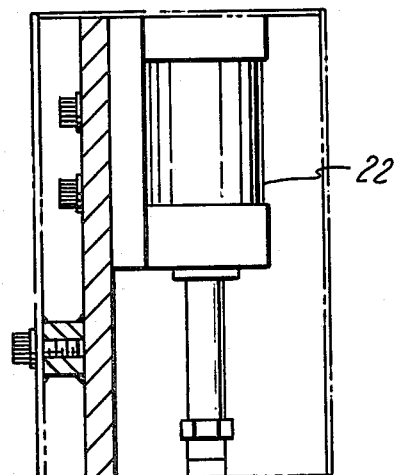
FIG. 4
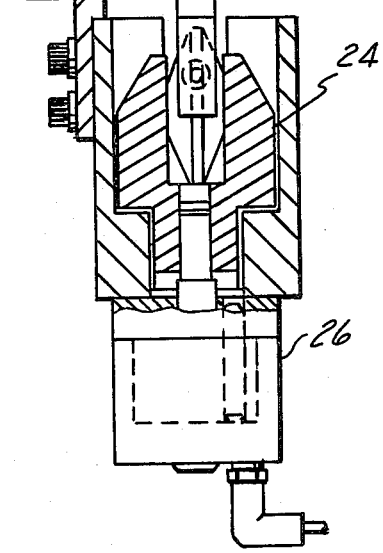
FIG. 3
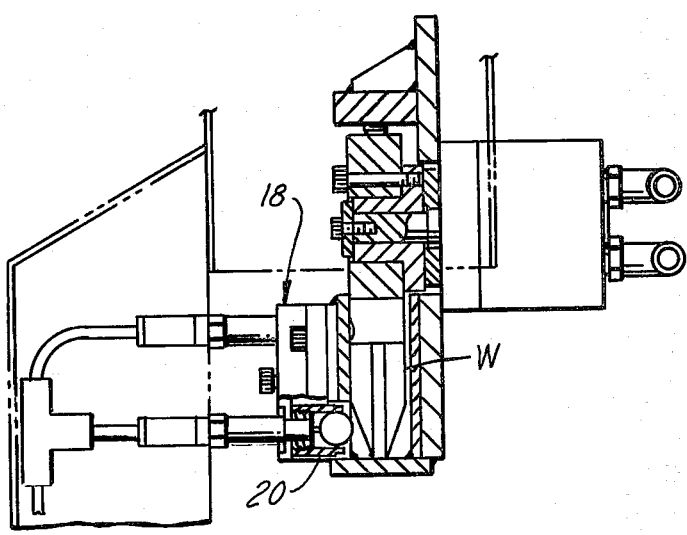

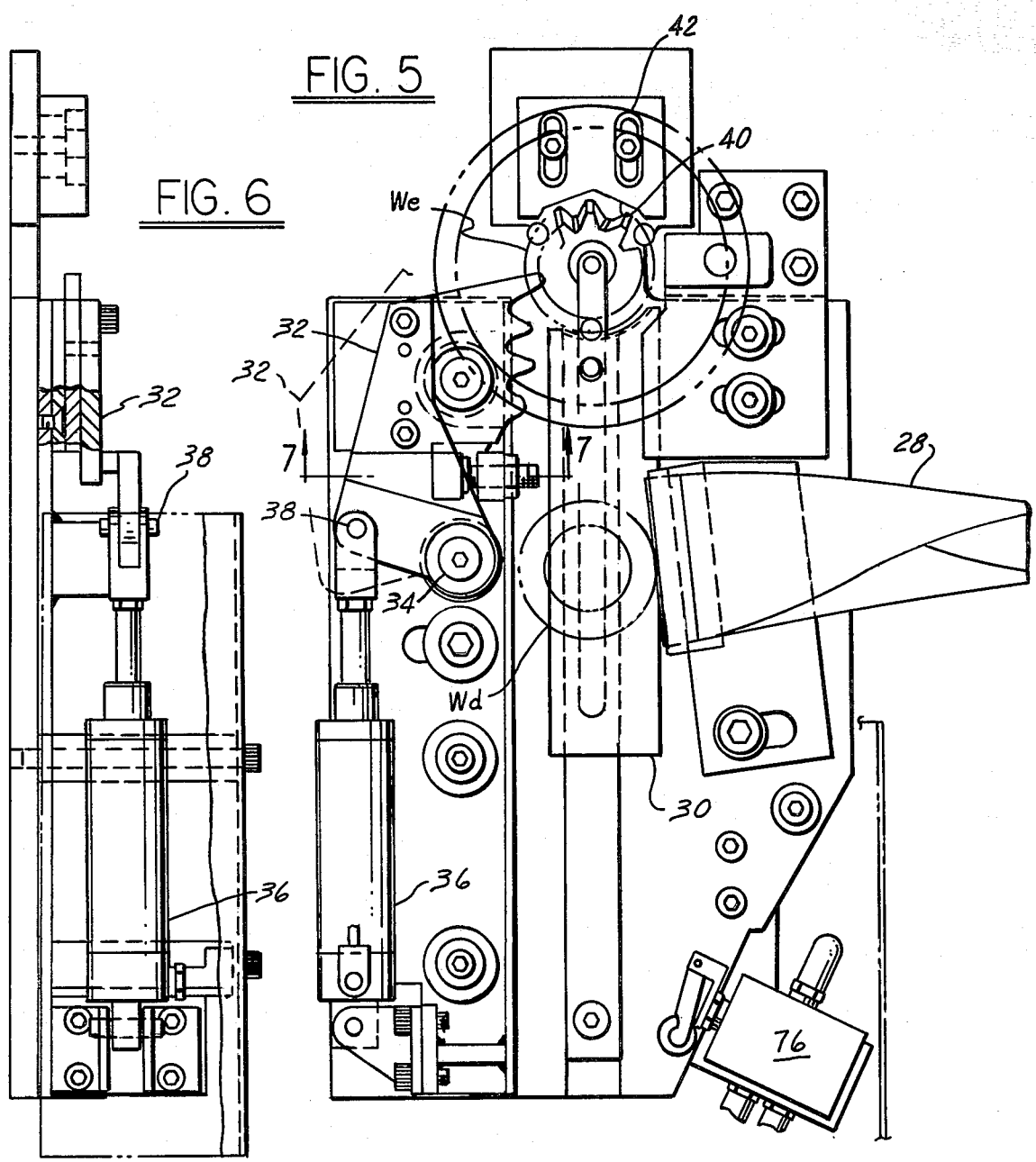
FIG. 5
FIG. 6
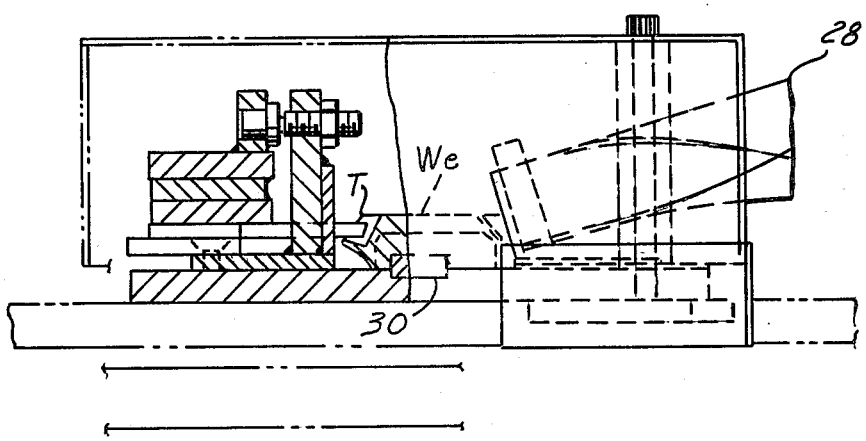
FIG. 7

POSITIONING AND ALIGNING LOADER

STATE OF THE ART

The present invention was made as a part of a program to produce toothed gears, particularly conical gears, characterized by economies resulting in a saving of material and increased production of available machines, as well as an improved finished product. This is accomplished by cold forming blanks to approximately the required form of gears, particularly conical gears, in which the teeth are formed to leave a small amount of stock to be removed in a subsequent machining operation. Gear cutting machines are available on the market adapted to cut the teeth from a solid blank to produce the final desired gear form. This of course involves the removal of relatively large quantities of metal and the time required is of course much longer than would be required to remove a small amount of stock. The machines which have been used for this purpose since they operate on a solid blank, do not require that the blank have any particular angular location or orientation.

As presently known, machines for this purpose, to which the present invention is adapted, include a transfer device having a loading arm to pick up a blank from a pickup station and to transfer it to the gear cutting machine tool spindle and an angularly disposed unloading arm adapted to pick up the finished gear from the cutting station and to transfer it to discharge means such as an unloading chute.

A gear cutting machine of the type referred to is manufactured by the Gleason Company and is sold under their trademark REVACYCLE.

BRIEF SUMMARY OF THE INVENTION

In accordance with the present invention, tooth blanks are formed by a cold forming operation in which the teeth are formed with excess material adapted to be removed in a subsequent machining operation. Since the tooth blank is produced by cold forming, the teeth and particularly the root structure of the teeth are much stronger than teeth which are cut from a solid blank. In addition of course, substantial savings of material are effected since the tooth spaces are essentially the result of the cold forming operation and cutting away material to produce the tooth spaces is avoided.

The tooth blank as produced by the cold forming operation has opposite sides of different conformation and it is a requirement that the tooth blank be presented for transfer into the gear cutting machine with a selected side of the blank in the proper position, which position is uppermost in the present invention.

The blanks, which are of generally circular outline, are rolled by gravity down an inclined inchute into position against a rotatable part stop. At this time the position of the blank is sensed. The part stop is then rotated to release the foremost blank and to block advance of the successive blanks. If the position of the part as sensed was reversed, the released blank continues into engagement with a movable part release gate and while in position determined by the part release gate, it is rotated through 180° to correct its position. The gate is then operated to release the properly positioned leading tooth blank and to permit the next succeeding tooth blank to move into engagement with the gate upon actuation of the part stop.

If the blank was in proper position when sensed, the gate is in open position and the part advances through a 90° twist chute which positions the blank on its side with the selected side uppermost. The blank is then advanced into a pick-up station by a slide. It is of course essential that as the gear is received in the pick-up station, its teeth must be in accurately controlled angular location so that in the subsequent machining operation, equal amounts of stock may be removed by machining by opposite sides of the teeth.

This is accomplished by pushing the blank along a path in which its toothed peripheral portion engages a part orientor or locating rack having teeth of special form. The blank is thus rotated into precisely determined angular position, and is held in such position by engagement between a fixed stop and the pusher slide.

In the case of a conical gear as contemplated herein the teeth of the part orientor rack overlie portions of the teeth of the blank so that it is necessary to move the rack into clearance position after orientation before the tooth blank can be lifted and transferred to the cutting station.

While theproperly positioned and located blank is retained in the pick-up station a transfer device having a loading arm has swung about a vertical axis to position a pick-up head above the blank at the pick-up station. Downward movement of the loading arm operates means effective to swing the toothed part orientor laterally into a clearance position.

The pick-up head on the loading arm carries a downwardly spring biased plate carrying the plurality of round ended locating pins which are receivable in angularly separated tooth spaces so as to produce the final accurate location of the blank. The head also carries a pair of opposed pick-up fingers which are spring biased inwardly and which are adapted to be cammed outwardly to snap over the peripheral portions of the blank.

The transfer arm is then raised, the head carrying the tooth blank in properly predetermined position for engagement with a work spindle on the machine. As the transfer arm is swung to move the head from a position over the pick-up station it operates controls which are effective to restore the tooth orientor rack to its operative position and the slide is retracted for engagement with the next succeeding blank.

The tooth blank is deposited on a spindle or arbor of the gear cutting machine in proper position for removal of relatively minor equal amounts of stock from opposite sides of the teeth.

While no part of the present invention, the transfer device includes an unloading arm which is lowered into engagement with a finished gear, picks it up by spring pressed engagement and transfers it to an unloading station.

BRIEF DESCRIPTION OF THE DRAWINGS

FIG. 2 is a fragmentary side elevation as seen from above in FIG. 1.

FIG. 3 is a section on the line 3—3, FIG. 1.

FIG. 4 is a section on the line 4—4, FIG. 1.

FIG. 5 is a fragmentary plan view of the part of the loader not seen in FIG. 1.

FIG. 6 is an elevational view of the structure shown in FIG. 5.

FIG. 7 is a sectional view on the line 7—7, FIG. 5.

DETAILED DESCRIPTION

Referring first to FIGS. 1-7 the loader comprises an inchute 10 in the form of a trough in which the tooth work gears W are received. In the embodiment of the invention shown, the loader is designed for use with a tooth gear blank in which the teeth T as best seen in FIG. 7, are the teeth of a conical gear and in which the opposite sides of the blank are differently shaped and/or dimensioned.

Figure 1:
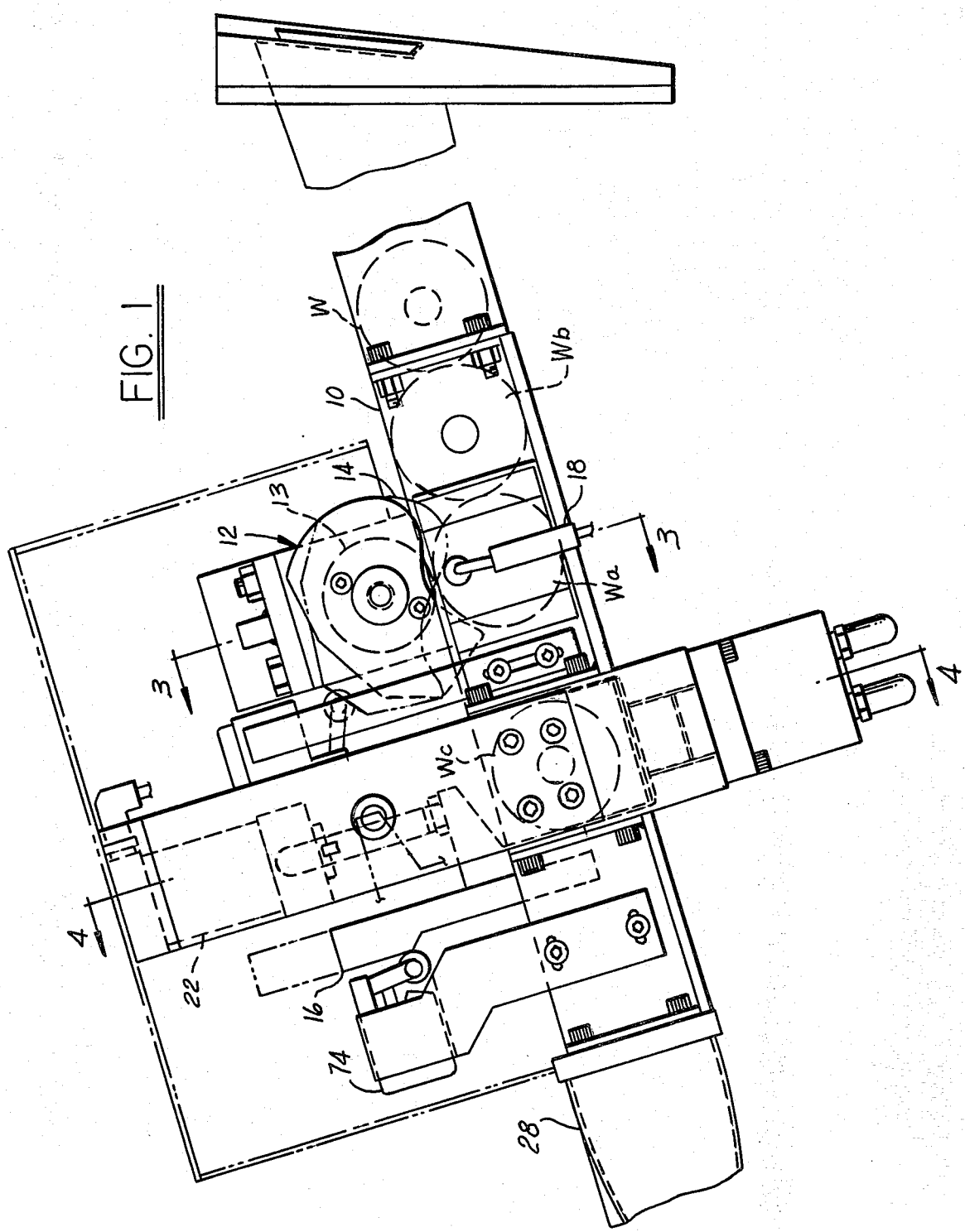
FIG. 1 is a fragmentary elevational view of the entrance portion of the positioning and locating loader.

As the blanks roll by gravity down the inchute 10 the leading blank here designated as Wa engages a parts stop 12 which is adapted to be rotated by a rotary actuator 13 from the position shown in full lines in FIG. 1 in which it forms a positive stop for the leading work gear Wa. When rotated clockwise by rotary actuator 13 to the dotted line position indicated in FIG. 1, a lobe 14 on the stop engages the next succeeding work gear Wb while releasing the leading work gear Wa which moves forwardly to or through a turn-around station. While the work gear is held stationary in position Wa, its position with reference to the position of its respective sides is sensed by a position sensor 18 which includes air release valves actuated by balls 20 engageable with the side of the gears presented to the sensing means 18. The details of this sensing means forms no part of the present invention and it is in fact a purchased unit.

If the proper side of the tooth work blank W is presented to the position sensor, the part release gate 16 remains in the release position indicated in dotted lines in FIG. 1.

If however the position sensing unit 18 determines that the work gear W is reversed from its proper position, the gate 16 is moved by cylinder device 22 to stop position, and retains the gear in a turn-around unit 24 which is actuated by a rotary actuator 26 of known construction. This actuator rotates the turn-around device through 180° so as to correct misplacement of an improperly positioned gear. After the gear in the turn-around has been rotated 180°, the gate 16 is moved to the dotted line position of FIG. 1 and the work gear is permitted to move further along the chute.

As the work gear reaches the left hand end of the loader as illustrated in FIGS. 1 and 2 it enters a 90° twist chute 28 of generally rectangular cross-section which is adapted to deposit the work blank on a locator including an elongated guide in the position indicated at Wd in FIG. 5. It will be understood that at this time the work blank is positioned with its proper side up but with its teeth in random orientation.

With the work blank in the position Wd, a pusher slide 30 is actuated by an air cylinder to advance the work blank along the locator to the pick-up position indicated at We in FIG. 5. During advance of the blank from the position Wd to We its toothed periphery engages locating teeth on the part orientor rack 32. The rack is mounted for swinging movement as indicated at 34 in the horizontal plane between the full line position illustrated in FIG. 5 and the dotted line position thereof. Swinging movement of the rack is controlled by an air cylinder device 36 having a pivot connection 38 to the rack at a point spaced laterally from the pivot mounting 34.

In FIG. 5 it will be noted that the teeth of the orientor rack are of different shapes and dimensions. The first tooth engageable as the work gear is moved toward the pick-up station is a relatively short, relatively thick tooth of considerable lesser height than the succeeding teeth. The second and third teeth are also of less than full height but are relatively narrower than the first tooth, and the final locating tooth is formed and dimensioned to enter into substantially tight mesh with a tooth space of the work gear. With this arrangement the work gear is advanced and engages without interference into a meshing relation with the rack. In the full line position indicated at We in FIG. 5 the peripheries of the work blank is engaged against suitably shaped locating surfaces 40 in an adjustable stop block 42. At this time the blank is held in substantially accurate locating position as regards the angular position of the teeth and is held in this position by pressure applied between the slide 30 and the stop block 42.

From the description in the foregoing it will be apparent that the final tooth of the orientor rack 32 overlies portions of the tooth space in which it is engaged, a relationship which is well illustrated in FIG. 7. Accordingly, before the work gear can be lifted vertically for transfer to the tooth cutting machine, it is necessary to swing the rack to the dotted line position illustrated in FIG. 5 at 32'.

Referring now to FIGS. 8-12, there is illustrated the transfer device effective to transfer the properly positioned and located work piece from its pick-up position to the tooth cutting station of the gear cutting machine, where it will be properly received on a spindle or arbor for the subsequent machining. This device comprises a casting 50 mounted for back and forth oscillation in a horizontal plane and for vertical movement on or with a supporting shaft 52. The casting 50 comprises a loading arm 54 and an unloading arm 56. Arm 54 transfers a work gear from the pick-up station to a work station in the machine. Arm 56 transfers a finished work gear from the machine to a discharge chute or the like.

Loading arm 54 carries a transfer head 58 which is adapted to move downwardly onto a work gear at the pick-up station, to ensure precise angular location of the gear, and to engage it firmly to hold it in located position. The head 58 is then elevated with the casting 50, which is swung horizontally to carry the head 58 to a position above the working station of the machine, at which time casting 50 is lowered to cause the head 58 to deposit the gear in accurately located position in the machine.

Figure 8:
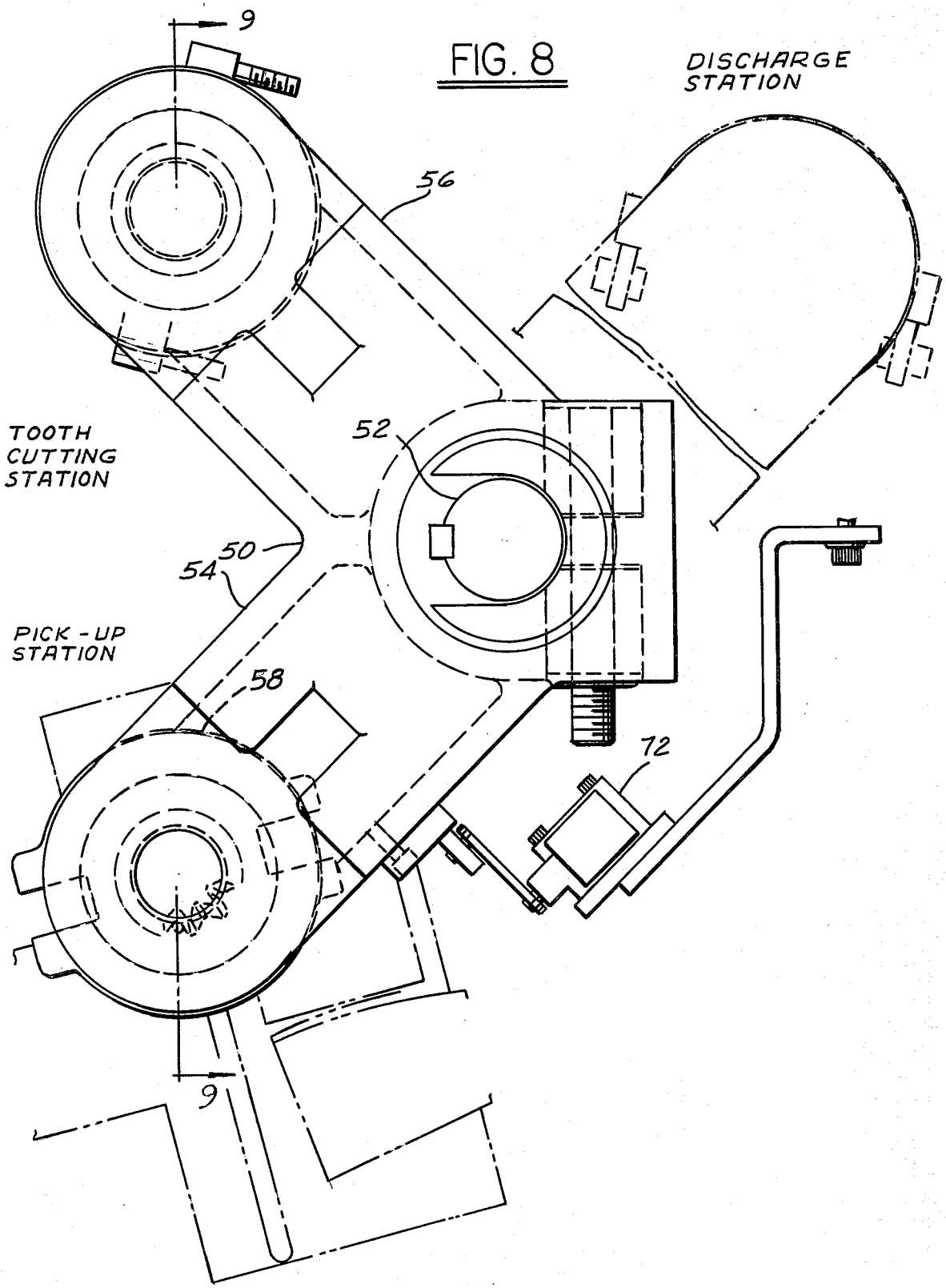
FIG. 8 is a plan view of the transfer device of the loader.
Figure 12:
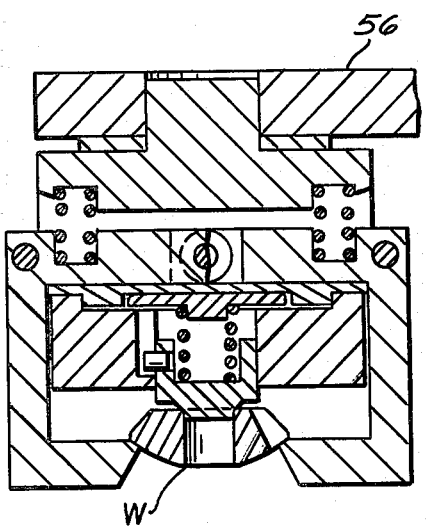
FIG. 12 is a section on the line 12—12, FIG. 9.

At the same time, a head on the unloading arm 56 picks up a finished gear from the machine and transfers it to the discharge station which is designated as such in FIG. 8.

Figure 9:
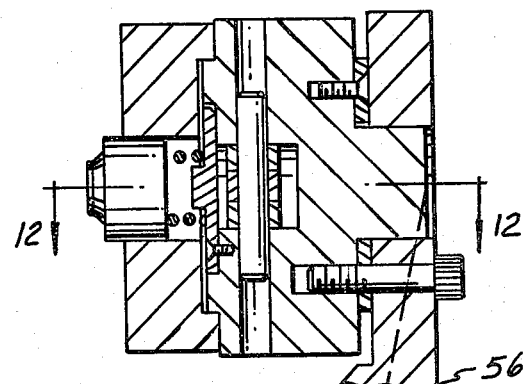
FIG. 9 is a section on the line 9—9, FIG. 8.
Figure 10:
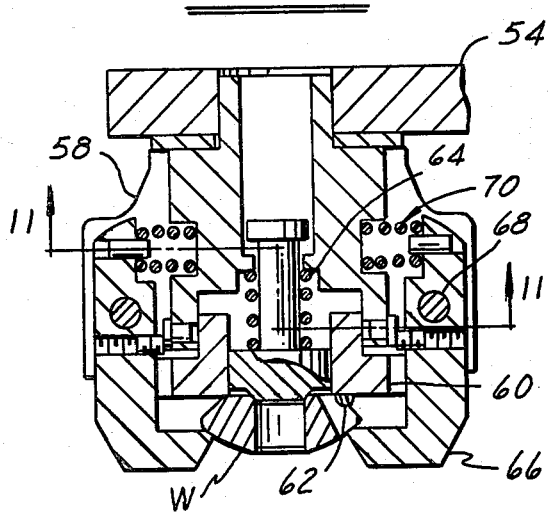
FIG. 10 is a section on the line 10—10, FIG. 9.
Figure 11:
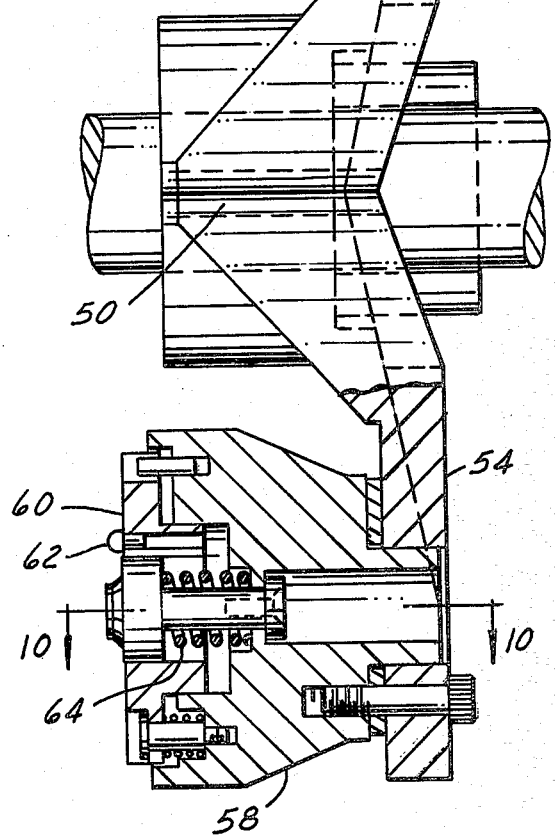
FIG. 11 is a section on the line 11—11, FIG. 10.
Figure 11:
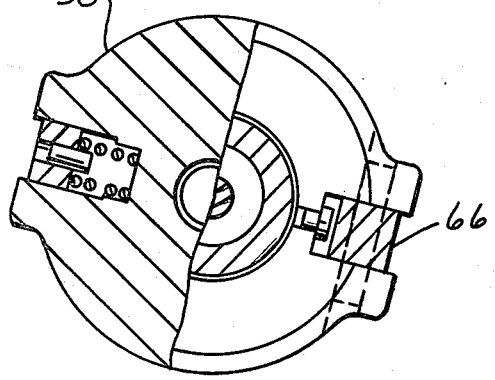

The pick-up head 58 as best seen in FIGS. 9, 10 and 11 comprises a vertically movable, non-rotatable spring pressed plate 60 carrying a plurality of final locating pins 62 which are herein illustrated as having generally hemispherical heads adapted to engage in tooth spaces of the work blank at substantially the pitch line thereof. The pins 62 are for the purpose of ensuring precise angular location of the work gear W as it is picked up at the pick-up station, and produce the accurate stock dividing function of the apparatus.

The spring means indicated at 64 permits the blank 60 to yield as the head moves downwardly to cause pick-up fingers 66 to engage over the periphery of the work gear, as best seen in FIG. 10. Pick-up fingers 66 are pivoted in slots in the head 58 as indicated at 68 and are biased by compression springs 70 to engage the tooth work gear blank W. The ends of the fingers 66 are inclined and as the head 58 moves downwardly the fingers snap over the blank W and retain it in firm located relationship to the angular plate 60 which carries the locating pins 62.

It is to be understood that the loader is entirely automatic in operation and that means are provided for sensing completion of each phase of the operation. In order to avoid complications, no effort is made to illustrate the means for controlling admission and release of air pressure from the various actuating cylinders, since control means for this purpose are familiar in the art. In general however it is noted that the loader is air operated and the conventional controls are part of an airlogic system. Incidently, a limit control valve is indicated at 72 which is actuated when the transfer device 50 travels downward from the full line position of FIG. 8. At this time the loading arm 54 traveling downward above the pick-up position and operation of the control valve 72 ensures that the part orientor rack is swung to clearance position whenever the loading arm 54 travels downward from the illustrated position. This prevents the possibility of damage to the orientor rack if for any reason a part has not been released at the machine but is returned to a position over the pick-up station.

A control valve is illustrated at 74 which is operated by gate 16, and another control valve 76 is positioned to be actuated by the pusher slide 30. Other control valves required to produce fully automatic properly sequenced operation are provided, and as usual failure to complete a programmed step will terminate operation until the fault is corrected.

I claim:

1. An automatic loader for a machine for removing stock from the teeth of a conically toothed part having opposite sides of different conformation and including a work support, said loader comprising a turn-around station including a rotatable part receiver, means for sensing the position of a part, means responsive to the position of the part to rotate the receiver through 180° if the part is reversed from its proper position, a locator having an elongated guide into which properly positioned parts are deposited with their teeth in random orientation, a pick-up station at one end of said guide having locating surfaces to limit movement of a part in said guide, means for advancing single parts along said guide into engagement with said surfaces, a stock dividing part orientor at one side of said guide having tooth means engageable with teeth on an advancing part to rotate the part into oriented position, a transfer device comprising a pick-up head engageable with a part at the pick-up station to grip the part firmly for movement from the pick-up station to the work support means of the machine, means for moving the head from pick-up position in the locator to deposit the part in working position on the work support of the machine, an inchute, a rotatable part stop in said chute to release single parts for advance in said chute to said receiver, a part release gate in said chute to stop a part in said receiver, and means for moving the gate to release a part only when the part is in proper position, the means for sensing the position of the part comprising sensing elements cooperating with a side of a part at said part stop, and means for positioning said part release gate in release position when the part is sensed to be in proper position when its position is sensed at said part stop, or if in reversed position at said part stop, only after rotation of said receiver through 180°.

2. An automatic loader for a machine for removing stock from the teeth of a conically toothed part having opposite sides of different conformation and including a work support, said loader comprising a turn-around station including a rotatable part receiver, means for sensing the position of a part, means responsive to the position of the part to rotate the receiver through 180° if the part is reversed from its proper position, a locator having an elongated guide into which properly position parts are deposited with their teeth in random orientation, a pick-up station at one end of said guide having locating surfaces to limit movement of a part in said guide, means for advancing single parts along said guide into engagement with said surfaces, a stock dividing part orientor at one side of said guide having tooth means engageable with teeth on an advancing part to rotate the part into oriented position, a transfer device comprising a pick-up head engageable with a part at the pick-up station to grip the part firmly for movement from the pick-up station to the work support means of the machine, means for moving the head from pick-up position in the locator to deposit the part in working position on the work support of the machine, in which said parts are received in pick-up position with the teeth thereof diverging downwardly, means mounting said part orientor for lateral movement between an operating position in which it partly overlies the part, and a clearance position in which it permits vertical lifting of a part by said head.

3. A loader as defined in claim 2, which comprises means responsive to movement of said pick-up head to a predetermined position during movement from said working position to pick-up position to move said orientor to clearance position.

4. An automatic loader for generally circular parts having opposite sides of different conformation, an inclined inchute along which a series of parts advance by gravity, a part stop in said chute movable to release a single part at a time, a position sensor in position to sense whether a part engaged by said stop is in correct or reversed position, a movable part release gate, a turn-around comprising a rotatable receiver in position to receive a part whose advance is prevented by said gate, means responsive to said position sensor to position said gate in release position if the part is sensed to be in correct position, means effective to rotate said turn-around receiver through 180° if the part is sensed to be reversed in the inchute and thereafter to move said gate to release position.

5. A loader as defined in claim 4, in which said part stop is movable between a first position in which the foremost of a series of parts in the inchute is stopped adjacent said position sensor, and a second position in which the foremost part is released for advance into or through said rotatable turn-around receiver depending on its sensed position and the next following part is stopped short of the position sensor.

* * * * *